CATHODE PULSING COMMUNICATION SYSTEM

Filed May 10, 1945 4 Sheets-Sheet 1

WILLIAM S. HALSTEAD
INVENTOR

By
ATTORNEY

Feb. 13, 1951 W. S. HALSTEAD 2,541,050

CATHODE PULSING COMMUNICATION SYSTEM

Filed May 10, 1945 4 Sheets-Sheet 2

WILLIAM S. HALSTEAD
INVENTOR

By [signature]
ATTORNEY

Feb. 13, 1951 W. S. HALSTEAD 2,541,050

CATHODE PULSING COMMUNICATION SYSTEM

Filed May 10, 1945 4 Sheets-Sheet 3

WILLIAM S. HALSTEAD
INVENTOR

By [signature]
ATTORNEY

Feb. 13, 1951 W. S. HALSTEAD 2,541,050

CATHODE PULSING COMMUNICATION SYSTEM

Filed May 10, 1945 4 Sheets-Sheet 4

WILLIAM S. HALSTEAD
INVENTOR

By [signature]
ATTORNEY

Patented Feb. 13, 1951 2,541,050

UNITED STATES PATENT OFFICE 2,541,050

CATHODE-PULSING COMMUNICATION SYSTEM

William S. Halstead, Purchase, N. Y., assignor, by mesne assignments, to Farnsworth Research Corporation, a corporation of Indiana Application May 10, 1945, Serial No. 592,993

7 Claims. (Cl. 250—6)

This invention relates to radio communication systems in which the power consumed by a radio receiver, during stand-by conditions, is reduced in average quantity.

More particularly, this invention relates to radio communication systems in which the receiver is cyclically shifted from a first condition wherein it is fully sensitive to received signals, to a second condition wherein a relatively very small amount of power is consumed thereby. The cyclic shifting is performed at such a rate, relative to the emission of calling signals from the transmitter, that such calling signals, persisting over an appreciable length of time, i. e. for three or four cycles, will actuate the receiver during some portion of its cyclic changes, when the receiver is operating at a level of normal sensitivity.

In further developed forms of this invention, there are included arrangements whereby the receipt of a calling signal will automatically cause an interruption of the cyclic power pulsing at the receiver, thereby maintaining the receiver in condition for receiving such signal continuously, and will warn the operator to switch manually to a non-pulsing condition, in order to receive a communication immediately following such calling signal.

In another development of this invention, the emission of a carrier wave by the transmitter, preparatory to the transmission of an actual message, suffices to cause automatic suspension of the power cycling operation at the receiver and causes such receiver to remain in a steady state of sensitivity, suitable for the reception of a subsequent communication upon such carrier wave.

In other developments of this invention, a plurality of characteristic audio frequency modulations emitted by the transmitter are used, respectively, to suspend power pulsing at the receiver, to give one or more alarm signals to the operator of the receiver, or to indicate to such operator that both the transmitter and the receiver are properly functioning, or all of these operations may be accomplished simultaneously.

One object of this invention is to economize the consumption of power in a radio receiver, when such receiver must be kept, for relatively long periods of time, in a signal responsive condition, even though no actual communication is taking place. One example of an instance of this nature is in the type of apparatus known in the art as "walkie-talkie." In this type of apparatus, the power supply is frequently derived from electro-chemical cells, either of the primary or of the secondary type, and, due to the relatively limited amount of energy available from such cells, it is extremely desirable that the power withdrawn from the cells be minimized, in order to extend, to the greatest possible degree, the number of hours or days over which such walkie-talkie may be used, before it becomes necessary to replace or to recharge the batteries thereof.

Another object of this invention is to provide a radio receiver in which the cathode heating current is periodically reduced to a very low value during stand-by operation of the receiver, while yet keeping the receiver in condition to respond to a calling signal, but in which receiver such cathode heating current is steadily maintained at the normal value thereof during periods of actual message reception.

Yet another object of this invention is to economize the use of anode supply current in a radio receiver during conditions of stand-by reception, by periodically reducing the temperature and consequent electronic emission of the cathodes of the various tubes in such receiver, thus simultaneously reducing or substantially eliminating the flow of anode current through these tubes.

Still another object of this invention is to provide a radio receiver in which the cathode power, and optionally the anode power are supplied to the receiver tubes only intermittently, at normal operating values thereof, until the momentary reception of the carrier wave upon which signal modulations are about to be transmitted, whereupon the receiver mechanism causing the intermittent power supply is automatically rendered ineffective and the receiver is supplied continuously with the full amount of normal operating power.

Another purpose of this invention is to provide a radio communication system in which the receiver, during stand-by periods, is fed with pulsing power and in which the transmitter, during periods of message transmission, emits a controlling or holding modulation of predetermined frequency, which modulation, upon the reception thereof, actuates a relay mechanism located at the receiver, this causing the pulsing power supply to be substituted by a continuous power supply suitable for message reception.

Yet another purpose of this invention is to provide a radio communication system in which the receiver normally is supplied with pulsing power and the transmitter is arranged to emit a modulation of predetermined frequency as a calling signal, such modulation being received and utilized to give visual or audible warning to the operator of the receiver, in order that such operator may manually alter the power supply to the receiver from a pulsing supply to a continuous supply, in order to allow message reception, or that he may take any other steps desired, to assure proper message reception.

Still another purpose of this invention is to provide a radio transmission system in which both transmitter and receiver are energized sufficiently to perform the respective functions thereof, only intermittently or in pulses, and in which a special checking signal is periodically or continuously emitted by the transmitter and utilized by the receiver to actuate thereat a warning light or other suitable arrangement indicating to the operator of the receiver that the entire communication system is functioning properly, notwithstanding the fact that no actual message is being transmitted over the system at the time.

A yet further object of this invention is to provide a radio receiver in which the cathode heating circuit is periodically and intermittently broken, so that the heating current is broken up into substantially square wave form or pulses, thereby causing the integrated or average current to be of a substantially lower value than would otherwise be possible, with consequent economy of power.

An additional object of this invention is to provide, in cyclically functioning radio transmission systems of the type just described, devices whereby any checking or calling signals radiated by the transmitter will bear such temporal relationship to the cycle of intervals during which the receiver is in a condition to receive such checking or calling signals, that a call or checking signal from the transmitter will not fail to be received, provided only that such signal persist more than two or three complete cycles, notwithstanding the absence of accurate synchronism between the respective transmitting and receiving cycles.

An additional purpose of this invention is to provide a radio transmitter in which currents of several different predetermined audio modulation frequencies are employed, in addition to voice modulation frequencies, and in which such frequencies as are employed for calling and checking purposes are transmitted in intermittent pulses, while another current of a frequency acting to maintain a receiver operative, i. e. a holding frequency, is transmitted continuously during the time that voice modulated frequencies are being transmitted.

This invention attains the above rectified purposes by providing inter alia, a switching device at the radio receiver which alternately shifts the cathode heating current from a normal value to a value sufficient to maintain the cathode temperature at a point just below electron-emissive temperature, which point is herein termed the temperature of incipient emission, and back again to a normal heating value.

One of the advantages of this invention is that it may be employed at unattended carrier current repeater stations and the like, to economize in the use of power thereat, thereby enabling the batteries located thereat to be made smaller and more compact or, alternatively, to be recharged or replaced at less frequent intervals, and consequently reducing upkeep expenses arising from necessary inspection and attendance at such normally unattended stations.

Further advantages of this invention will be apparent from the following specifications and hereunto appended drawings, where:

Fig. 1 is a schematic diagram showing cathode pulsing as applied to a receiving circuit.

Fig. 2 schematically illustrates a portion of a receiver in which cathode pulsing is controlled by a received carrier.

Figure 1:
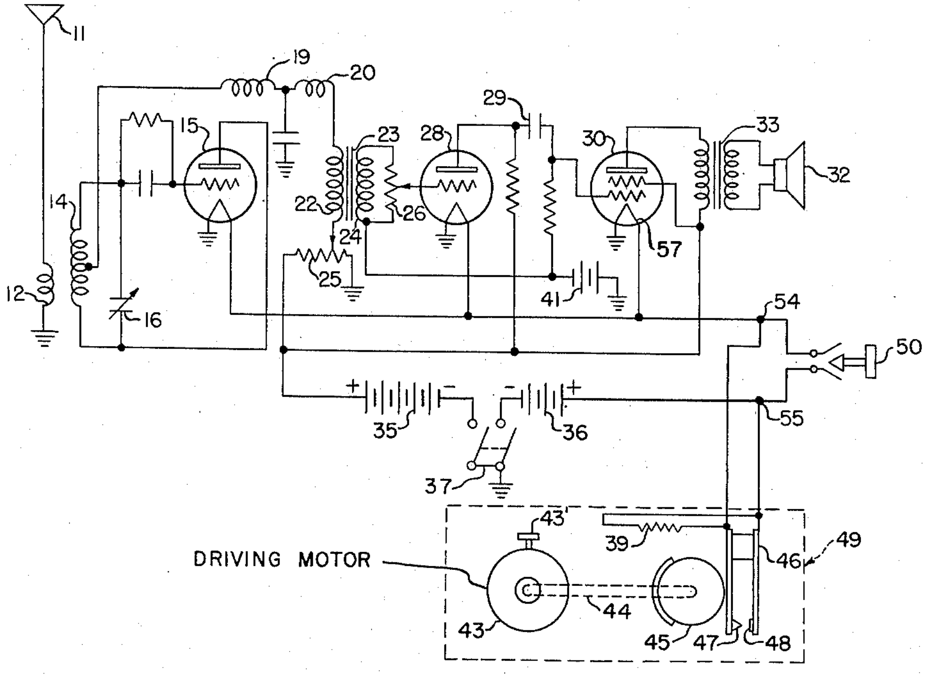

Fig. 1 schematically illustrates a super-regenerative receiver and associated audio amplifiers. Antenna 11 is connected to inductance 12, which latter is inductively coupled to the tuning circuit, consisting of inductance 14, and variable capacitor 16.

The signal output of detector tube 15 passes through the radio frequency chokes 19 and 20 to the primary winding 22 of interstage transformer 23. Volume control is accomplished by shunting potentiometer 26 across secondary winding 24 of interstage transformer 23, the variable arm connecting to control grid of audio frequency amplifier tube 28. Audio tube 28 is resistance coupled through coupling capacitor 29 to output tube 30, which latter energizes speaker 32 by means of output transformer 33. Regeneration is controlled by varying the plate voltage applied to tube 15 through potentiometer 25.

The negative terminals of both plate supply battery 35 and cathode supply battery 36 are connected to ground through on-and-off switch 37. The positive terminal of the plate supply battery 35 connects to the plate circuits of tubes 15, 28, and 30 and the positive terminal of cathode battery 36 feeds through resistor 39 to the cathodes of all the tubes. Negative bias voltage is supplied to the audio frequency tubes 28 and 30 by battery 41, or may be derived from any other suitable source, such as a biasing resistor (not shown).

Any suitable driving mechanism, such as a spring driven motor, 43, is connected through shaft 44 to cam 45. The lever or stem 43' illustrates conventional means for rewinding the motor spring mechanism. If it is electrically driven, suitable current feeding means are substituted for element 43'. When the cam operated cathode pulsing control switch 46 is in open position, as shown in Fig. 1, the series cathode resistor 39 will maintain the desired lower level of current flow from battery 36 to the tube cathodes. As cam 45 rotates, the raised portion thereof will engage one switch arm and will thereby cause contacts 47 and 48 to close, thus momentarily shorting out resistor 39 from the cathode circuit, thereby restoring full or normal operating current to the cathodes of tubes 15, 28, and 30, and allowing these tubes to function at full sensitivity, thereby permitting any signals, which may be picked up by the receiver, to be heard from speaker 32.

When the operator hears an incoming signal during the periodic or momentary time interval that the cathodes and tubes are functioning normally, he may change over from intermittent listening operation to steady listening operation, by the manual closing of switch 50. When switch 50 is closed, it shorts out the series cathode resistor 39, and consequently restores full or normal cathode current to all the tubes, thereby causing the receiver to assume the normal or steady state for reception and reproduction of signals.

When the operator no longer desires to have the receiver continue to function in a steady state of reception, with the consequent higher current drainage, he may cause it to revert to the intermittent and more economical state of operation by opening switch 50, which operation will effectively reinsert the series cathode resistor 39 and the cam operated cathode pulsing control switch 46 into the battery circuit, or circuit from any other suitable source of cathode heating power.

The speed of driving motor 43 and the shape of cam 45 may be such that the cathodes operate at their normal or full operating current for a time interval of one second, and at reduced current for the following two seconds, repeating this cycle as long as motor 43 is operating, but such particular time values are purely illustrative, and any other suitable values for the time intervals may be employed.

In certain instances the motor 43 may consist of an electrically driven motor combined with reduction gears or of any other suitable driving means, in place of the spring driven motor here indicated. For example a vibrator of the electromechanical type may be employed in lieu of a rotary type motor.

In certain cases it has been found desirable to reduce the cathode heating current substantially to zero, in the intervals when the receiver is not functioning at normal sensitivity. This is especially desirable in the case where batteries are employed as sources of power. In such cases, the tubes of the receivers are usually provided with directly heated cathodes, of the filamentary type. Such type of cathode responds thermally very rapidly to changes in the current passing therethrough, so that upon the initiation of current flow from battery 36, as brought about by the closing of contacts 47 and 48, the restoration of normal cathode emission in the various valves takes place in a very short space of time, for example usually within a small fraction of a second.

In order to secure the mode of operation just described, it is sufficient to omit resistor 39 from the pulsing device shown in Fig. 1. With such an arrangement, contacts 47 and 48 act to close and open the filament circuit in periodic manner, so that the current pulses thereby produced are of substantially square wave form.

When employing the modification just described, the actual breaking of the filament circuit, which takes place when contacts 47 and 48 separate from one another, frequently gives rise to a momentary pulse, which actuates loudspeaker 32, via transformer 33, thus causing a click to be heard from the loudspeaker. The presence of a succession of rapid clicks, may in some instances be found undesirable, for example where a stand-by receiver must be kept as silent as possible. It is possible to minimize or completely to avoid the occurrence of these clicks, by shunting a condenser of suitably high capacity across contacts 47 and 48, i. e. so that such condenser will occupy the same position as that shown in the drawing for resistor 39. When contacts 47 and 48 separate, such condenser will tend to prevent too rapid extinction of cathode heating current flow, by reason of the fact that the current flow will continue, in constantly diminishing intensity, until such condenser is charged to a potential substantially equal to that of battery 36. The current flow through the cathodes will accordingly be stopped, not in an abrupt manner, but in a more gradual fashion, so that the production of undesirable clicks is thereby avoided, or sufficiently reduced in intensity.

Figure 2:
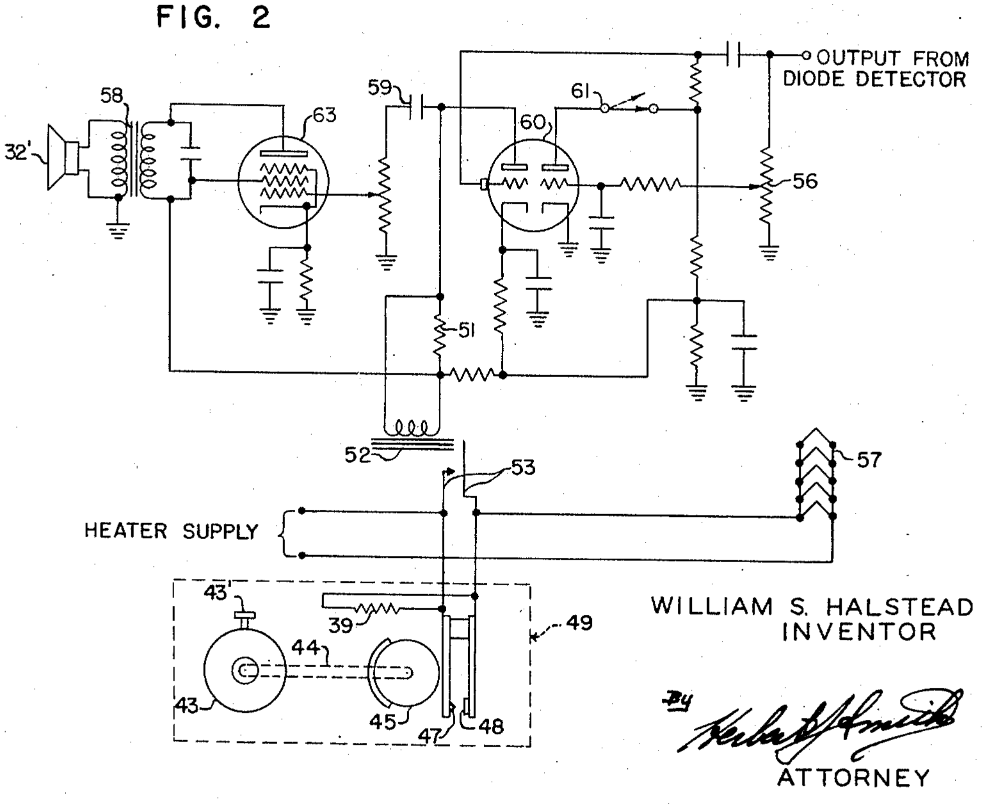

Fig. 2 shows a cathode pulsing circuit as controlled by the output of a diode detector of a superheterodyne receiver. Tube 60 is a dual triode in which one triode section functions in an audio amplification stage, coupled through capacitor 59 to output tube 63. The remaining triode of tube 60 functions as a squelch control, while potentiometer 56 acts as a diode load, and also permits regulation of the signal input voltage to the squelch control triode section of tube 60. Switch 61 provides a convenient means of cutting the squelch in or out of the circuit, for purposes well known in the art.

Carrier current signals, have previously been rectified in a diode detector circuit (not shown), and the audio frequency components derived therefrom are applied to the grid of the audio amplifier triode section of tube 60. There are provided means for this carrier signal to perform a dual function in the plate circuit of the same triode, namely, to supply audio excitation to the control grid of power output tube 63, and to actuate relay 52.

The driving motor 43 is connected through shaft 44 to cam 45. The rotation of cam 45 will cause contacts 47 and 48 alternately to open and close at predetermined intervals, as described in connection with Fig. 1. In Fig. 2 the making and breaking of contacts 47 and 48 of the cathode pulsing control unit 49 causes series cathode resistor 39 alternately to be inserted, or effectively to be removed from cathode heaters 57. The result is that the receiver is being alternately operated in a state of full sensitivity, and in a non-responsive state. When indirectly heated cathodes are employed, as in Fig. 2, the relative durations of the operating and non-operating periods of pulsing control 49 are selected so as to compensate for the slower heating and cooling action of an indirectly heated cathode type of tube. In this case, substantially no clicks are produced by the make and break, due to the electrical separation of heater and signal circuits.

A carrier operated relay 52 is shunted across plate load resistor 51 in the plate circuit of the amplifier section of tube 60. During the time interval that the receiving circuit is in operation, the presence of a carrier signal will create a current flow through relay 52, thus causing closure of contacts 53, which in turn effectively shunts resistor 39. Subsequently, and as long as the carrier signal is present, the relay 52 will, by the effective removal of resistor 39 from the cathode circuit, restore and maintain the receiver at full operating efficiency, in so far as cathode heating is concerned. Thus, there is accomplished by an electromagnetic relay, the automatic determination of alternate "listen" and "stand by" conditions in the receiver. The removal of the carrier signal from the receiver will cause the flow of plate current in the amplifier section of tube 60 to decrease, and the subsequent de-energizing of relay 52 causes contacts 53 to open, thereby placing the receiver in "stand by" condition, at which time the cathode pulsing control 49 will continue to maintain the monitoring state of periodic sensitivity in the receiver.

Figures 3, 4, 5:
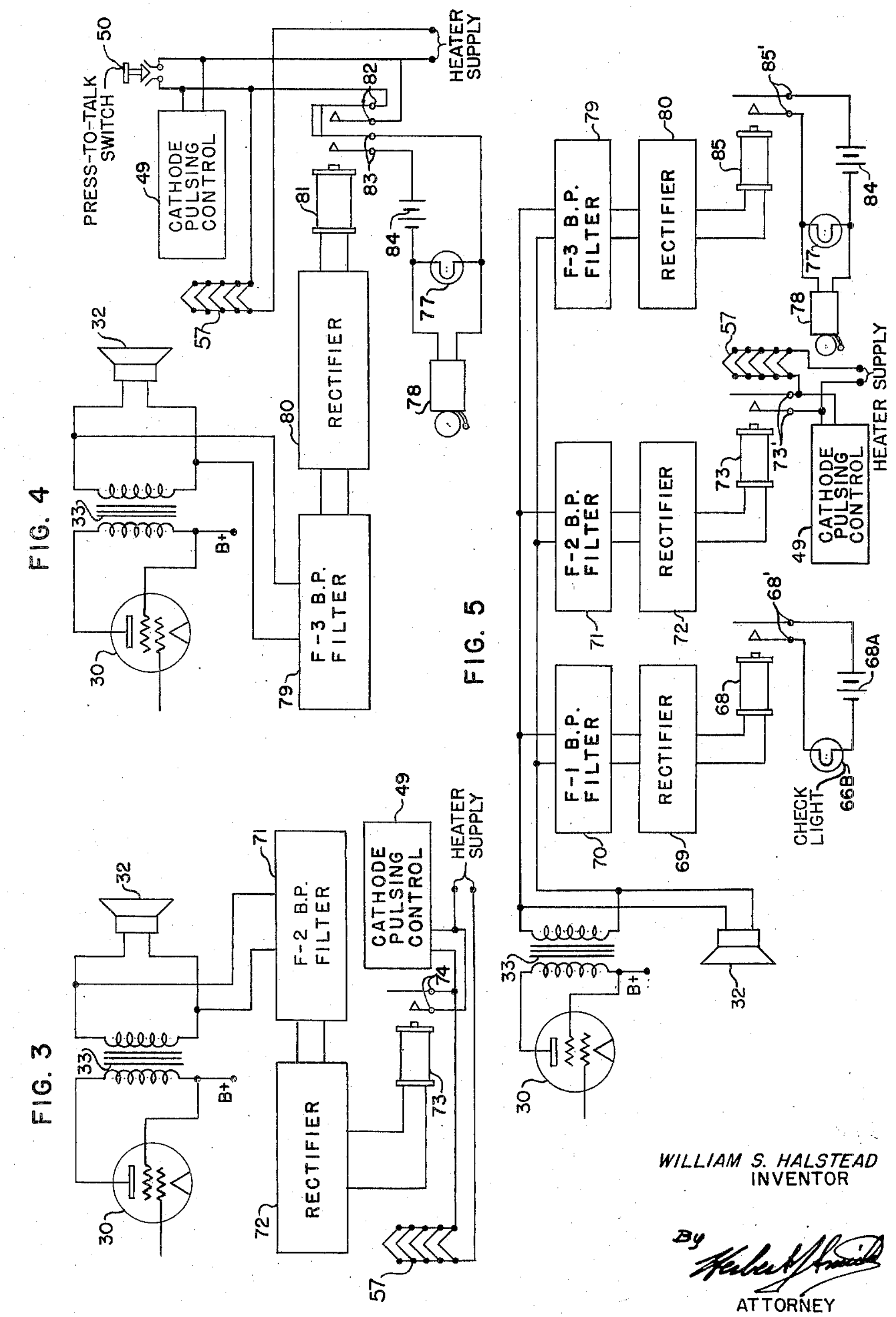
Fig. 3 is a block diagram of a receiver output stage showing the cathode pulsing controlled by a holding tone.
Fig. 4 illustrates, in block diagram, a receiver output stage controlling both a cathode pulsing unit and call indicators by a single tone frequency.
Fig. 5 represents, in block diagram, a receiver output stage embodying operation of cathode pulsing, call indicators, and a checking indicator, all by separate tone frequencies.

Fig. 3 represents one manner of connecting a receiver output tube 30 through matching transformer 33 both to a loudspeaker 32, and also to a band pass filter 71. The band pass filter 71 passes substantially only a predetermined frequency, F2, which frequency is then fed through rectifier 72, of which the output voltage is used to energize hold-in relay 73. Upon the closing of contacts 74 of hold-in relay 73, the receiver is automatically changed from the intermittent monitoring condition in which it had been maintained by cathode pulsing control 49, to a state of steady reception, until there occurs the removal of carrier borne hold-in or talk signal frequency F2 from the receiver input. At this time the hold-in relay 73 releases and opens contacts 74. The receiver unit will then revert to the state of periodic monitoring. By employing for F2 a supersonic frequency, relay 73 will continue to operate without causing interference with the voice frequency signals from loudspeaker 32. When a low frequency, such as 50 cycle, tone is used for hold-in frequency F2, the inability of a small type transducer to reproduce such low frequency may be utilized to allow the maintenance of a condition of non-interference with the reproduction of speech. Therefore, by utilizing a frequency lower than that which the speaker 32 can effectively reproduce, separation of the hold-in frequency from the speech frequencies may also effectively be secured.

Fig. 4 is a diagram illustrating the application of a call light 77 and signal bell 78 to the output of a receiver. Receiver output tube 30 is coupled through output transformer 33, both to a loudspeaker 32 and to a band pass filter 79, which latter will pass a different predetermined frequency, F3. The output F3, of band pass filter 79 is passed through rectifier 80, and the resultant voltage is applied to relay 81, thereby causing it to close the two pairs of contacts, 82 and 83. The closing of contacts 83 applies potential from battery 84 to the call signal indicator lamp 77, and also to the buzzer or bell 78. With the closing of contacts 82, the receiver is temporarily changed from its intermittent monitoring state, in which it had previously been maintained by cathode pulsing control 49, to a condition of steady reception, as long as the call signal, or tone frequency F3, is used to modulate the carrier wave. The visual and aural call signal indicators 77 and 78, may be operated continuously, or may be keyed in response to a predetermined code or other selective method of applying frequency F3 to the carrier signal at the transmitter.

A manually operated switch 50, which is shunted across filament pulsing control unit 49 is used by the operator of the receiver to allow steady reception of the communication or message following the calling signal. The releasing of manual switch 50 restores the unit to the monitoring condition, and thereby consequently effects economy of tube and battery life.

Fig. 5 is a diagram in which is shown a receiver output arrangement wherein three separate band-pass filters 70, 71 and 79 and the respective rectifiers 69, 72 and 80 are used to operate the respective relays 68, 73 and 85, thus enabling the use of three separate tone frequencies, in order selectively to perform to several different functions.

A receiver output tube 30 is coupled through transformer 33 to the input of band pass filters 70, 71 and 79, and also to loudspeaker 32, in parallel with all three filters.

Band pass filter 70 passes checking modulation frequency F1 to the rectifier 69. The current output from rectifier 69 feeds relay 68, thus determining the closing and opening of relay contacts 68', thereby determining the application of current from local battery 68A to the receiving check light 66B, thus causing the light to glow or to be extinguished according to the presence or absence of incoming current modulated at frequency F1. Checking frequency F1 is transmitted and received at regular short intervals, and the consequent periodic glowing and extinguishing of the check signal indicator lamps 66B furnishes a proof of the integrity of the system, so that the operator at the receiver may constantly be informed as to the operativeness of both the transmitter and the receiver.

Band pass filter 71 will pass another modulation frequency, F2, to the input of rectifier 72. The current output from rectifier 72 is then applied to the winding of hold-in relay 73, thereby causing contacts 73' to close. The relay contacts 73' are connected in shunt with the cathode pulsing control 49, and the closing of contacts 73' causes the receiver to change from a state of intermittent monitoring to a state of steady reception, as previously explained in the discussion of Fig. 3.

Band pass filter 79 will pass yet a third modulation frequency F3, termed the calling frequency, to the input of rectifier 80. The output current from rectifier 80 is then used to energize relay 85, this resulting in the closing of relay contacts 85' and in the application of electrical energy from battery 84 to the call indicator light 77 and to the bell 78. This call indicator circuit is especially advantageous, inasmuch as the transmitter operator, immediately prior to a communication, or at any other desired time can, by modulating the carrier wave with frequency F3, substantially instantly call the receiver operator's attention, both by audible and by visual means.

Figure 6:
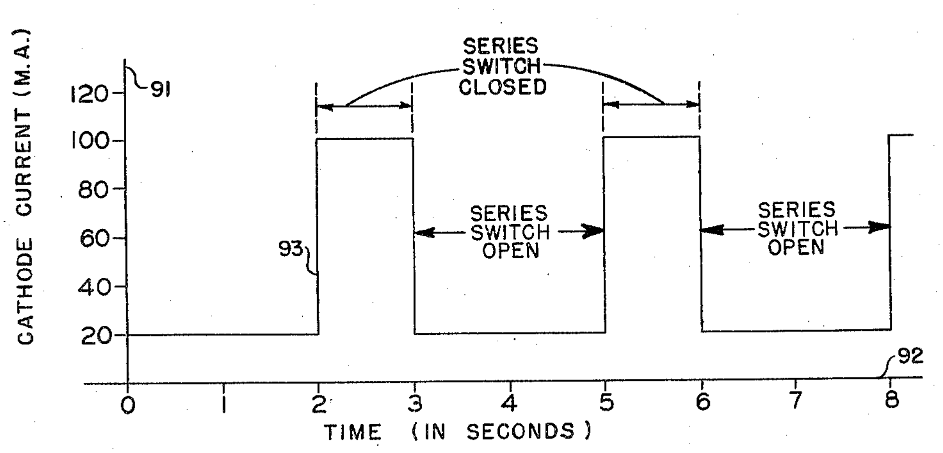
Fig. 6 is a graph showing one typical receiver cathode pulsing time sequence.

Fig. 6 is a graphic representation showing the pulsing or time control, as applied to the cathode current control of vacuum tubes employed with receiver circuits such as those shown in Figs. 1, 3, 4 and 5. The vertical scale 91, of ordinates is graduated in units of the cathode current, expressed in milliamperes. The horizontal scale 92, of abscissas, is graduated in units of one second and shows the time cycles. Curve 93 shows a minimum cathode current of 20 milliamperes for the first two second interval, after which the current rises, for the duration of the third interval of one second, to its full or normal value of 100 milliamperes. This current time cycle is repeated, corresponding to the rotation of cam 45, thus affording cathode pulse control, determined by the operation of the device shown at 49, in Fig. 1. Thus the horizontally extending peak of the square wave 93, Fig. 6, represents a one second interval of time during which a receiver will operate at full efficiency, whereas the horizontal base of square wave 93 indicates the subnormal operation of said receiver during the following interval of two seconds. It is to be understood that these values of current and time are given by way of example, and not of limitation.

Figure 7:
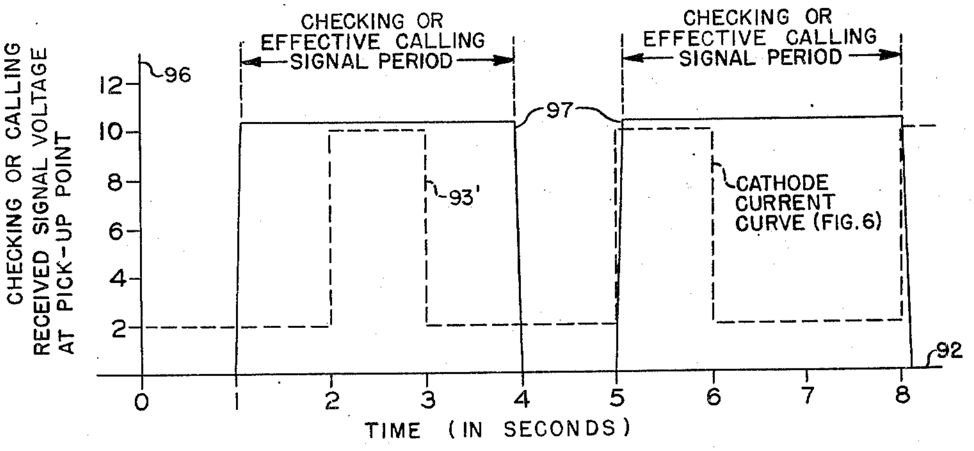
Fig. 7 is a graph showing superimposed transmitter pulsing and receiver cathode pulsing sequences.

Fig. 7 is a graphic representation of the time cycle employed at the transmitter and the relationship thereof to the time cycle of a receiver, as the latter has already been illustrated in Fig. 6, showing the occurrence of coincidence of receptive and calling conditions.

The vertical scale of ordinates 96 indicates, in units of received signal voltage, the checking or calling signal carrier current 97, while the dotted curve 93′ portrays the receptive period of a receiver, as determined by the cathode current time control cycle.

It will be observed, when the receiver cathodes operate at their full or normal current for a time interval of one second out of three consecutive seconds, and when the transmitter checking or calling period has a duration of three consecutive seconds out of four, that the checking or calling signal will be received at three out of every four of the intervals during which the receiving tube cathodes are operating at their normal emissive temperatures. Temporal overlap of the transmitter and receiver cycles thus determine proper cooperation, notwithstanding the absence of synchronism between the respective cycles.

While there have been shown illustrative values for the time cycles at the transmitter and the receiver, it will be apparent that these time cycles may have values different from the precise values shown in Figs. 6 and 7. As long as the length of each transmitted pulse is greater than the length of each interval when the receiver is in a non-sensitive condition, the transmitting pulses must of necessity overlap some interval during which the receiver is operating at full sensitivity, so that a persisting call signal will not fail to be received, provided that this relation of relative pulse duration be maintained.

In both Figures 6 and 7, it has been assumed that the cathodes at the receiver are of the filamentary type, which type heats and cools with relatively great rapidity, so that the electron emission will substantially correspond with the current waves 93 and 93′. Actually, due to the thermal lag of the filaments, the vertical portions of curves 93 and 93′ will assume a slight angle from the perpendicular, but this factor does not materially alter the operation of the system, as just described.

However, when indirectly heated cathodes of the type shown in Fig. 2, are employed, the phenomenon of thermal lag takes on increasing importance, so that curves 93 and 93′ will depart to a considerable extent from a strictly square wave form, and consequently the length of time during which such cathodes are operating at fully normal emissive temperature will be somewhat reduced. In such cases, it may be found desirable to lengthen out the individual cycles, either at transmitter or at receiver, or at both these points, in order to make certain that coincidence of normal sensitivity at the receiver with the transmission of a calling signal, is secured within the space of a relatively small number of cycles.

Figure 8:
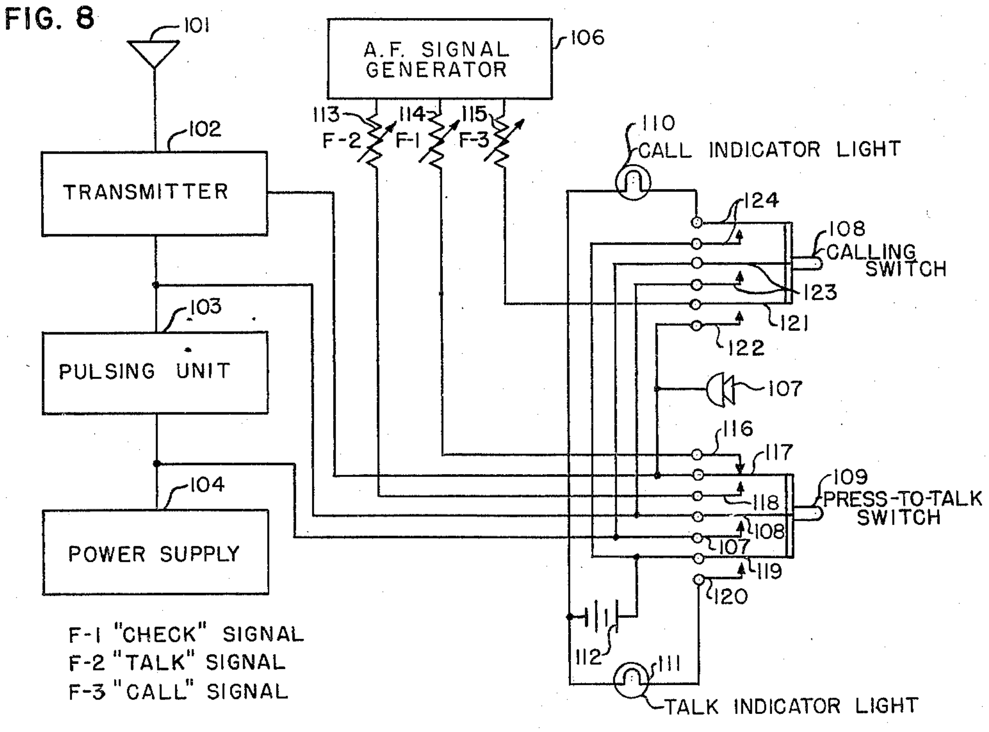
Fig. 8 is a block diagram portraying a transmitter and associated controls for use with a cathode pulsed receiver.

Fig. 8 is a block diagram of a combination transmitter and communication controls, consisting of antenna 101 connected to the output stage of transmitter 102 and including pulsing unit 103, power supply 104, audio frequency multi-signal generator 106, microphone 107, calling switch 108, and press-to-talk switch 109. Also there are shown call indicator light 110, talk indicator light 111, signal light battery 112 and modulation amplitude controls 113, 114 and 115.

Pulsing unit 103 is connected to the circuit of transmitter 102 in such a way that the pulsing unit automatically controls the operation of transmitter 102 by placing it in an operative condition for a time cycle of three consecutive seconds followed by a one second inoperative period, as shown in Fig. 7, curve 97, such value being illustrative, and not restricting. Mechanism for securing this result may be substantially identical with the receiver pulse control unit 49, or may assume any other suitable form.

During this stand-by period, the pulsed carrier wave is modulated by check frequency F1, from generator 106, the degree of modulation being controlled by modulation amplitude control 114 which regulates the output, at frequency F1, from the audio frequency generator 106, the signal then passing through contacts 116 and 117 of switch 109, which latter in turn applies the signal to transmitter 102. Instead of pulsing the carrier, it is possible alternatively to transmit a continuous carrier and merely to pulse the modulating check frequency F1.

The checking signal may be of any predetermined suitable frequency, preferably 3000 cycles or higher, which is above the normal band of communication speech frequency, or a subsonic frequency may be used, but any other frequency may be employed, a frequency within the normal speech range yielding a loudspeaker checking signal additionally to the visual signal.

"Talk" frequency F2, or the receiver "hold in" signal, may be, for example, a 50-cycle tone or a supersonic frequency derived from audio signal generator 106 and connected through modulation amplitude control 113 to contact 118 of press-to-talk switch 109. When switch 109 is closed, the movable contact 117 makes connection with contact 118 thereby causing the application of check signal frequency F2 to the transmitter 102, for purposes of modulation. Simultaneously, the depressing of switch 109 removes the pulsing unit 103 from the circuit and places the transmitter 102 in full operation. At the same time, the closing of contacts 119 and 120 of switch 109 causes the talk indicating light 111 to glow, by applying to it current from battery 112, thus giving the transmitter operator visual indication that he may then proceed to employ voice modulation. Frequency F2 and speech frequencies are applied simultaneously to the transmitter, the purpose of employing the F2 frequency being to operate the hold-in relay 73, (Fig. 3), and to maintain the receiver in normal listening condition.

Still referring to Fig. 8, call frequency F3 supplied by the audio frequency generator 106 is fed to modulation amplitude control 115 and then to movable contact 121 of calling switch 108. When switch 108 is placed in the call position, contact 121 is closed against contact 122, thus causing the application of the calling frequency F3 from generator 106 to the transmitter, for the purpose of tone modulation. The call frequency may be, for example, a 1000 cycle tone, which will be heard at the receiving position through loudspeaker 32, (Figs. 4 and 5), simultaneously actuating relay 85, this actuation resulting in call light 77 and bell or buzzer 78 being placed in operation. Any other suitable frequency may be used for frequency F3.

The depressing of call switch 108 (Fig. 8) also removes the pulsing unit 103 from the circuit, and by the closing of contacts 123 the power supply 104 is placed in normal operation. At the same time, call indicator light 110 is excited from the battery 112, due to the simultaneous closing of switch contacts 124.

Figure 9:
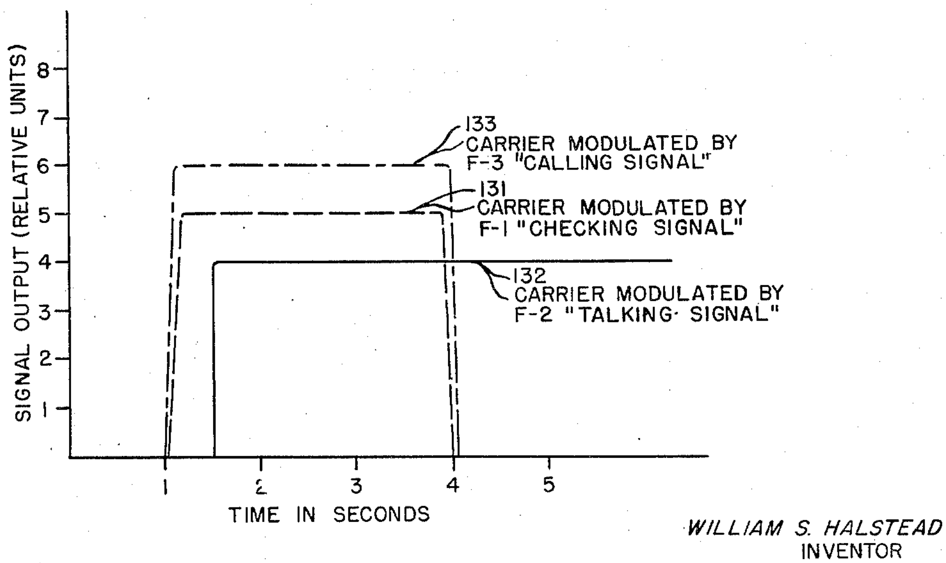
Fig. 9 is a graph illustrating the relative amplitudes of receiver output signals of differing types.

Fig. 9 portrays the three distinct curves of frequencies F1, F2, and F3, where F1 is the checking signal frequency, F2 is the talking signal frequency, and F3 is the calling signal frequency. Fig. 9 shows the various frequencies as being of different signal intensity, the frequency strength being controlled by the modulation amplitude controls 114, 113, and 115 (Fig. 8), for the frequencies F1, F2, and F3, respectively.

Three curves, 131, 132 and 133 represent the frequencies F1, F2, and F3 respectively. While the three curves are shown as having certain relative amplitudes, different from one another, it is to be understood that this is merely an arbitrary showing and that the relative amplitudes may have any other values, consistent with the particular requirements of the operator and sufficient to satisfy any operational requirement.

Curve 131 represents a relative receiver output, when the receiver is tuned constantly to a carrier wave modulated by the checking signal frequency F1, the checking signal pulse being of three seconds' duration. Curve 132 represents the relative receiver output when tuned to a carrier wave modulated by the talking signal frequency F2, the continuous wave being maintained for the duration of the communication which is represented by one end of the curve extending beyond the duration of any heretofore referred to pulse period. Curve 133 represents the relative receiver output when turned to a carrier wave modulated by a calling signal frequency F3, the calling signal pulse being of three seconds' duration. All the values just given are by way of example and not of limitation.

I claim:

1. A radio receiver including means for periodically reducing the sensitivity thereof, signal demodulation means, frequency selective means fed from said demodulation means and responsive to a predetermined signaling frequency, a rectifier fed from said frequency selective means, a relay fed from said rectifier and having two sets of contacts, a warning signal coupled to one of said sets of contacts, said other set of contacts being coupled to said first means and acting to suspend the effective action of said periodic sensitivity reducing means, as long as said predetermined signaling frequency is being received, whereby said warning signal functions uninterruptedly while said signaling frequency is being received.

2. In a radio receiver having a tube with an electrically heated cathode, a current saving device operative during standby reception, said device including, connected between a source of cathode heating current and said cathode, a resistor large enough to reduce said current to a value sufficient to heat said tube to the point of incipient emission only, a normally operative make and break switch cyclically short circuiting said resistor so as to restore said heating energy to substantially full value sufficient for normal emission, and a switch serving when closed steadily to short out said resistor, whereby steady operation of said receiver during message reception is secured by closure of said switch.

3. A radio signaling system, including at the transmitter means for emitting a carrier, means for modulating said carrier by three different tone frequencies and also by speech frequency, and including at the receiver an electronic tube and means for supplying heating current thereto, means normally periodically reducing said tube heating current to a value sufficient to heat said tube only to incipient emission, relay means actuated by the first received tone frequency to nullify the effect of said periodic current reducing means, signaling means actuated by the second received tone frequency to indicate the operation of said transmitter and signaling means actuated by the third received tone frequency to give an alarm, thereby indicating that said transmitter is ready to be modulated at speech frequency.

4. A radio receiver comprising a circuit including a plurality of electron tubes, a cathode energizing source, an impedance connected to said source and the cathodes of said tubes for controlling the current flow therein, a switch connected to said impedance, means for periodically operating said switch to change the current in said cathodes, a second switch connected across said impedance, and a carrier current responsive device connected to said circuit for operating said second switch.

5. A radio receiver comprising a circuit including a plurality of electron tubes, a cathode energizing source, an impedance connected to said source and the cathodes of said tubes for limiting the current flow therein, a switch connected to said impedance, means for periodically operating said switch to change the current in said cathodes, a second switch connected across said impedance, and a relay connected to said circuit and responsive to received signals for operating said second switch.

6. A radio receiver comprising a circuit including a plurality of electron tubes, a cathode energizing source, an impedance connected in series with said source and the cathodes of said tubes for limiting the current flow therein, a switch connected across said impedance, a motor-operated cam for periodically closing said switch to increase the current in said cathodes, a second switch connected across said impedance, and a relay connected to said circuit and responsive to received signals for closing said second switch.

7. A radio receiver comprising a circuit including a plurality of electron tubes, a cathode energizing source, a resistor connected in series with said source and the cathodes of said tubes for limiting the current flow therein, a switch connected across said resistor, a motor-operated cam for periodically closing said switch to increase the current in said cathodes, a second switch connected across said resistor, and an electromagnetic relay connected to said circuit and responsive to received signals for closing said second switch.

WILLIAM S. HALSTEAD.

REFERENCES CITED

The following references are of record in the file of this patent:

UNITED STATES PATENTS

| Number | Name | Date |
|---|---|---|
| 954,641 | Marconi | Apr. 10, 1910 |
| 1,941,067 | Armstrong | Dec. 26, 1933 |
| 2,055,921 | Baker | Sept. 29, 1936 |
| 2,165,062 | MacKay | July 4, 1939 |
| 2,176,868 | Boswau | Oct. 24, 1939 |
| 2,245,652 | Dickert | June 17, 1941 |
| 2,321,651 | Caraway | June 15, 1943 |
| 2,368,778 | Purington | Feb. 6, 1945 |
| 2,369,230 | Hansell | Feb. 13, 1945 |
| 2,381,754 | Jadraque et al. | Aug. 7, 1945 |